(No Model.)
C. T. HOWARD.
CUT-OUT FOR TELEGRAPH INSTRUMENTS.
No. 262,949.  Patented Aug. 22, 1882.
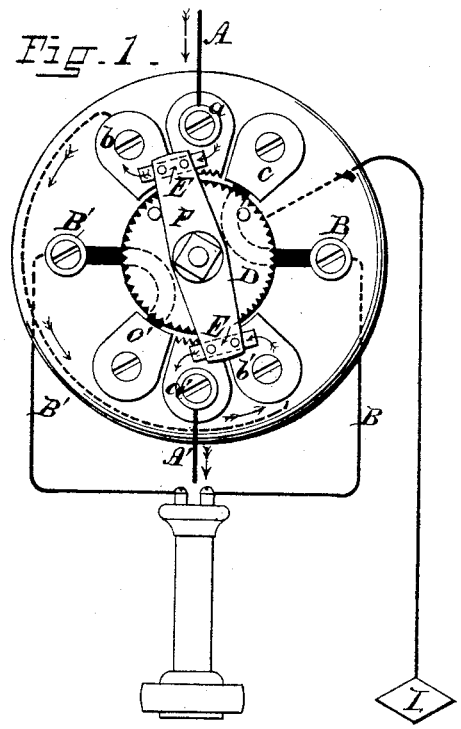
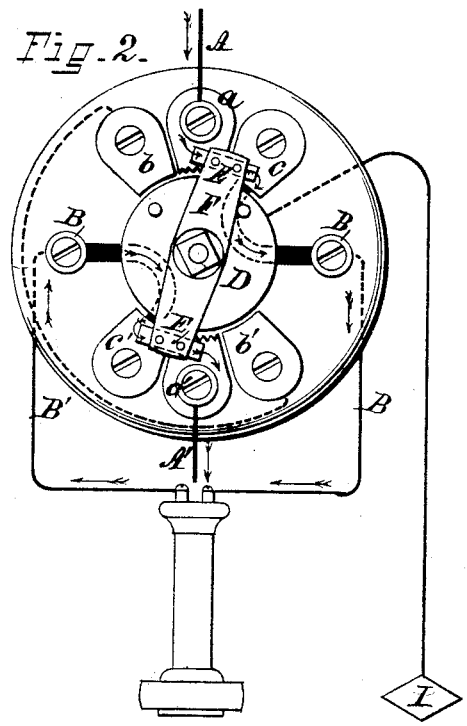
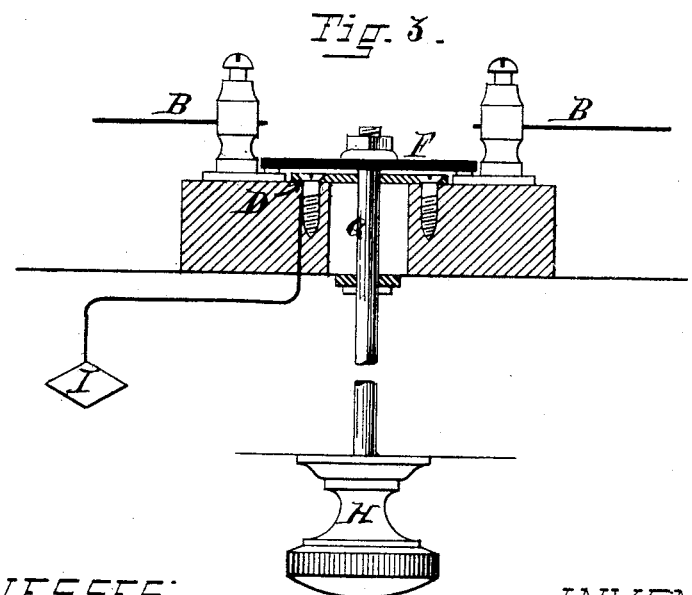
WITNESSES:
Wm L. Cook,
H. J. Miller
INVENTOR:
Charles T. Howard
by Joseph A. Miller & Co.
Att'ys
N. PETERS, Photo-Lithographer, Washington, D.C.

UNITED STATES PATENT OFFICE.

CHARLES T. HOWARD, OF PROVIDENCE, RHODE ISLAND.

CUT-OUT FOR TELEGRAPH-INSTRUMENTS.

SPECIFICATION forming part of Letters Patent No. 262,949, dated August 22, 1882.

Application filed April 10, 1882. (No model.)

*To all whom it may concern:*

Be it known that I, CHARLES T. HOWARD, of Providence, in the county of Providence and State of Rhode Island, have invented a new and useful Improvement in Protectors for Telegraphic Instruments; and I hereby declare that the following is a full, clear, and exact description of the same, reference being had to the accompanying drawings, forming part of this specification.

The extensive use of telephone-instruments in private residences, public and private buildings under the care of the general public, the ramification of telegraph and telephone wires, and the rapid introduction of the electric light with wires charged with electricity of a high tension have produced new elements of danger to telegraphic and telephonic instruments and those using the same.

The present invention has reference to an improved shunt or switch, which is arranged to cut off all electric currents from the interior of dwellings or other buildings whenever it is desired to do so on account of a thunder-storm, or when the air is excessively charged with electricity, and which will also carry off any excessive currents accidentally produced, either by atmospheric electricity, the contact of telegraph or telephone wires with wires charged with electricity of a high tension, or from other causes, without entering the building.

The invention consists in a novel arrangement of devices for accomplishing the object in view, as will be hereinafter fully described, and pointed out in the claims.

Figure 1 is a view of my improved shunt or switch, showing the electric current disconnected from the telephone-instrument. Fig. 2 is a view of the same, showing the line connected with the instrument. Fig. 3 is a sectional view, showing the bridge connected with a knob placed into the interior of the building, so as to operate the same from the interior.

In the drawings, A is the line-wire connecting with the switch, and A' the continuation of the line-wire.

B is the wire to the instrument, and B' the wire from the same.

$a$ and $a'$ are plates connected with the line-wire.

$b$ and $b'$ are two plates connected by a wire, indicated by a broken line.

$c$ and $c'$ are two plates connected with the clamp-posts to which the wires B and B' are secured. The connection between the plates $c$ and $c'$ and the lines B and B' connecting with the instrument is preferably made with lead or other material which by an abnormal powerful current of electricity is liable to fuse, or by a connection of lower conductivity than the wires A and A', so as to prevent abnormal powerful currents from entering the building, even when the line is directly connected with the instrument.

D is the ground-plate placed in close proximity to the plates $a\,b\,c$ and $a'\,b'\,c'$. This plate is preferably provided with a serrated edge, and shown of circular form, such form being most convenient for the device shown, in which the shunt is operated by the turning of a knob; but any other form of the plate D can be used, and the plates $a\,b\,c$ and $a'\,b'\,c'$ placed near the same when a sliding motion is used to operate the shunt.

E E are two metallic bridges secured to the arm F, which, being made of a non-conducting material, is secured to the rod G, extending through the wall of the building, and on its interior end is provided with the knob H, by which it can be freely turned.

The plates $a\,a'$ are preferably provided with serrated ends near the plate D, and the plates $b\,b'\,c\,c'$ may also, if desired, be provided with serrated ends.

A good and reliable ground-connection, I, is connected with the plate D, so that any electric currents may be quickly carried to the ground, and thus discharged from the lines. The direction of the currents is indicated in Figs. 1 and 2 by the arrows.

Considering, now, the operation of the device: When in the normal condition the line is connected with the instrument located in the building and the device located on the outside of the same. It will be seen on examining Fig. 2 that the current enters on the line A and passes to the plate $a$, which, being connected with the plate $c$ by the bridge E, carries the current to the plate $c$, and through the connection made with it and the post, to the line B, and so to the instrument, from which it passes, through the line B' and the connection between the clamp, to the plate $c'$, and by the bridge E to the plate $a'$, and thus to the line-wire A'. If, now, from any cause an abnormal, excessively powerful current of electricity is produced, the excess will be carried to the ground by means of the plate D and its ground-connection, assisted by the dam or stoppage of the inferior conducting-power of the connection between the line B B' and the plates c c'.

When the instrument is not in use, and when it is desirable to disconnect the same on account of atmospheric disturbance to avoid the annoyance of the calls on a telephone, or for any other reason, by turning the knob H the bridges E E will be swung over to connect the plates a b and a' b', as is shown in Fig. 1. The instrument is now cut off from the line, the current passing from the line-wire A to the plate a, by the bridge E, to the plate b, by the connecting-wire to the plate b', thence by the bridge E to the plate a', again onto the line-wire, the proximity of the grounded plate D to the current also acting as a safety or relief outlet for any abnormally-excessive, powerful current by carrying the surplus to the ground.

The arm F is limited in its motion by stops, (shown in Figs. 1 and 2,) so that the turning of the knob until the stops are reached will always make the desired connection or disconnection of the instrument with or from the line.

Having thus described my invention, I claim as new and desire to secure by Letters Patent—

1. In a shunting apparatus, the combination, with a central ground-plate, of two line terminal plates having their edges adjacent thereto, two plates arranged for connection with the opposite terminals of an electric instrument, two plates connected electrically together, a swiveling-bar of non-conducting material, carrying at its opposite ends metallic bridges arranged to connect the line-terminal plates with either the two plates which are electrically connected together or the two plates arranged for connection with the instrument, and means for connecting the swiveling bar with a handle located within a building, while the remainder of the apparatus is arranged outside the same, the whole constructed and operating as specified and for the purpose set forth.

2. A shunt placed outside of a building, consisting of the plates a, a', b, b', c, and c', connected as described, the knob H, the lever F, and bridges E E, and the grounded plate D, placed in close proximity to the plates a a', the whole constructed to connect or disconnect the instrument and carry off abnormal powerful currents of electricity, as described.

CHARLES T. HOWARD.

Witnesses:
 J. A. MILLER, Jr.,
 WM. L. COOP.